July 23, 1929.   L. HANSEN   1,721,731
COMBINED GATE AND LIQUID DISPENSER
Filed June 21, 1928

Inventor
L. Hansen
By Howard A. Sturges
Attorney

Patented July 23, 1929.

1,721,731

UNITED STATES PATENT OFFICE.

LAURITS HANSEN, OF OMAHA, NEBRASKA.

COMBINED GATE AND LIQUID DISPENSER.

Application filed June 21, 1928. Serial No. 287,210.

This invention relates to a combined gate and animal oiler. One of the objects of the invention is to provide a gate of ordinary construction generally used by farmers for controlling passageways from one field to another, said gate being provided with a second gate which may permit sheep or swine to move from one field to another without opening the first named gate.

Another object is to provide an oiler or liquid dispenser for the treatment of swine while moving through the second gate.

It is often desirable when feeding stock to confine cattle in certain fields or pens and also to permit swine or sheep to enter any of the fields or pens. The invention is particularly of advantage for these purposes.

Another object is to provided a small gate which may control a passageway in a fence, or wall of a pen or a passageway in a large gate which will operate automatically or by action of swine or sheep, and to be of such simple construction that it may be produced at a very limited expense. Also to provide an oiler which will consist of few parts and free from complications so that it may be conveniently manufactured, will be durable in use and will operate by action of the animal.

With the foregoing objects in view and others to be mentioned the invention presents a new and useful construction, combination and arrangement of parts as described herein and claimed, and as illustrated in the accompanying drawing, it being understood that changes may be made in form, size, proportion and minor details, said changes being determined by the scope of the invention as claimed.

Figure 1:
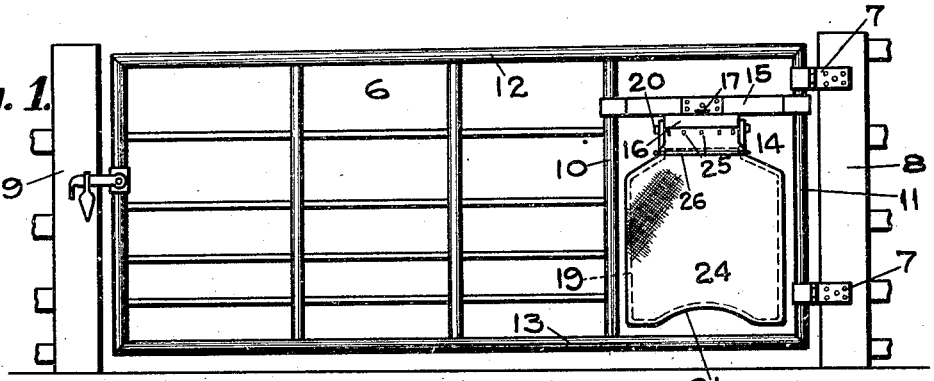
Figure 2:
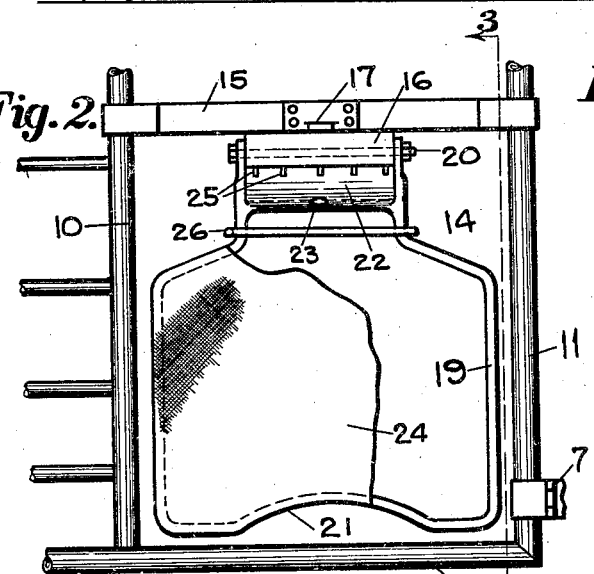
Figure 3:
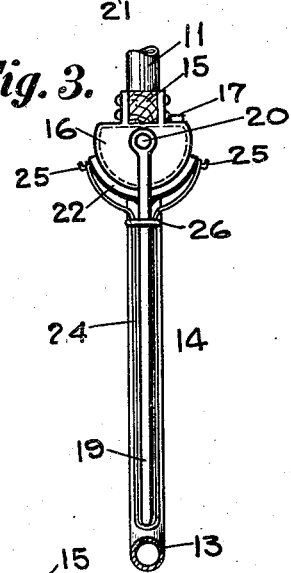
Figure 4:
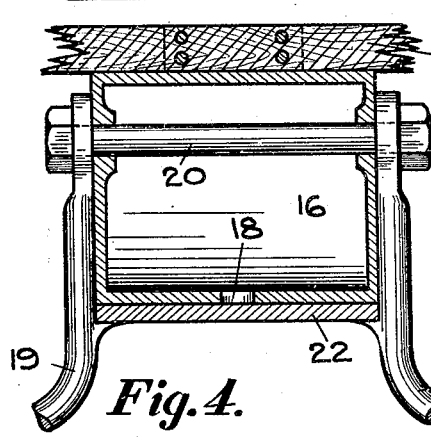
Figure 5:
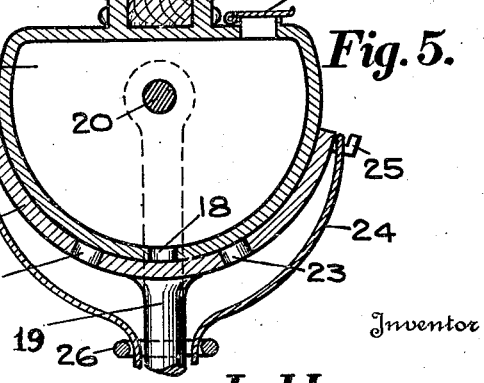

In the drawing Fig. 1 is a side view of a gate having a passageway therethrough provided with a small gate. Fig. 2 is a broken away view on an enlarged scale of the small gate shown in Fig. 1. Fig. 3 is a sectional view on line 3—3 of Fig. 2. Figs. 4 and 5 are detail views, Fig. 4 showing a stationary oil-tank and a movable valve-plate in longitudinal section. Fig. 5 is a view of the oil-tank and valve-plate in transverse section.

Referring now to the drawing for a more particular description, numeral 6 indicates a gate provided with hinges 7 and adapted to swing from a post 8 and while in closed position to be secured to the gate post 9. Numerals 10 and 11 indicate upright strips or bars, and at 12 and 13 are indicated horizontal strips or bars for the frame of the gate 6.

I provide a second gate 14 adapted to have swinging movements presently to be described. Numeral 15 indicates a horizontal supporting-bar which is shown in Fig. 1 to be disposed between the vertical frame-members 10 and 11. Numeral 16 indicates a cylindrical tank adapted to contain oil or medicated liquid to be dispensed, said tank being secured to the bar 15, said tank being provided with a lid 17 to permit it to be filled with oil or medicated liquid and having a discharge port 18.

The gate 14 consists in part of a frame 19 approximately of U-shape, its arms near their upper ends being pivotally mounted, as indicated at 20, to the ends of the tank, said frame 19 preferably having an inwardly bent part or depression 21 midway between its ends.

The frame 19 is provided with a valve-plate 22 having a pair of ports 23 disposed adjacent to each other. The valve-plate 22 is of segmental form in cross-section and is adapted to fit snugly on the curved surface of the tank.

Mounted on the U-shaped frame is a fabric cover 24, its upper end preferably being mounted upon the hooks or holders 25 of the valve-plate. This cover is preferably constructed of coarse fabric having a rough surface. It has the form of a bag or sack and is drawn taut upon and fits the frame snugly.

Numeral 26 indicates a pressure-member adapted to surround the bag or cover 24 adjacent to and below the valve-plate 22, for pressing the cover inwardly and maintaining it in a taut condition.

Having described construction, operation will be readily understood. The frame 19 together with its cover 24 provide the gate 14 adapted to be swung forwardly or rearwardly on the pivotal mounting 20, the valve-plate 22 moving with the frame 19 and sliding on the curved surface of the tank. Any movement of oil or medicated liquid through the port 18 of the tank while the gate 14 is disposed in a vertical position will be prevented since the valve-plate 22 will prevent such movement. However when the gate 14 has a swinging movement in either direction one of the ports 23 will be disposed in register with the port 18 to permit the liquid to flow into the bag which becomes saturated with the oil or medicated liquid.

The frame 19, preferably, is metallic and on account of its weight and weight of the saturated sack or cover 24, will be pressed upon the back of the animal while moving through the passageway, the depression 21 being of advantage to facilitate engagement of the lower end of the bag or cover with the back of the animal.

In instances when it is desired to permit sheep to move from one field to another, the gate may be readily removed, the bolt 20, best shown in Fig. 4, permitting a convenient removal of the frame 19 and its jacket or cover 24.

While the device is of great advantage in the treatment of swine to permit their range to be extended from one field to another and for maintaining them in a healthy condition, it is obvious that it could be used for the treatment of cattle, the proportion of parts being changed for this purpose.

It will be noted that the parts required for the device are few, and therefore it may be manufactured conveniently and at a limited expense.

I claim as my invention,—

1. In a combined gate and oiler a horizontal support, an oil-tank stationary with the support and having a discharge port, a frame approximately of U-shape provided with an apertured valve-plate and a fabric cover on the frame, said frame being mounted with its valve-plate engaging the tank and adapted to have swinging movements to dispose said apertures in register with the discharge-port of said tank.

2. In a combined gate and liquid dispenser, a support, a cylindrical tank stationary with the support and provided with a discharge-port, a frame below the tank, a segmental valve-plate carried by the frame and provided with apertures, a fabric cover on the frame, said frame being pivotally mounted with the valve-plate engaging the tank and adapted to have swinging movements to dispose its opertures in register with the discharge port of the tank.

3. In a combined gate and liquid dispenser for a passageway, a stationary tank above the passageway having a discharge port, a frame in the passageway below the tank, a valve-plate mounted on the frame and provided with ports, said frame being pivotally mounted with the valve-plate engaging the tank and adapted to have swinging movements, its ports registering with the discharge-port of said tank.

4. In a combined gate and liquid dispenser for a passageway, a cylindrical stationary tank above the passageway, a frame, a flexible cover on the frame, a segmental valve-plate secured to the frame and provided with ports, said frame and its flexible cover being normally disposed in said passageway with the valve-plate engaging the tank, said frame being movable outwardly of the passageway for disposing the ports of the valve-plate in communication with the discharge-port of said tank.

5. In a combined gate and liquid dispenser, a support, a cylindrical tank secured to the support and provided with a discharge-port, a frame approximately of U-shape having an inwardly projecting bow-shaped part between its arms, a segmental valve-plate between and secured to the arms of the frame and provided with ports, a flexible jacket covering the arms and bow-shaped part of the frame, said frame being pivotally mounted and adapted to be reciprocated in a circle's arc, the ports of its valve-plate communicating, in alternation, with the port of said tank.

6. In a combined gate and liquid dispenser, a support, a cylindrical tank secured to the support and having a discharge-port, a frame below and pivotally mounted on the tank, a segmental valve-plate secured to the frame and provided with ports, a flexible jacket on the frame, said frame being movable to dispose the ports of its valve-plate, in alternation, in communication with the port of said tank.

7. In a combined gate and liquid dispenser for a passageway, a stationary cylindrical tank above the passageway and having a discharge-port, a frame pivotally connected in the tank and disposed in the passageway, a segmental valve-plate having ports and provided with holder-members and secured to the frame in engaged relation with the tank, said frame being movable to dispose the ports of its valve-plate in register with the port of said tank, and a flexible cover on the frame in engagement with the holder-members of said valve-plate.

In testimony whereof I have affixed my signature.

LAURITS HANSEN.